United States Patent [19]

Heckner

[11] 3,883,260
[45] May 13, 1975

[54] VIBRATION PLATE SYSTEM

[75] Inventor: Helmut Heckner, Munich, Germany

[73] Assignee: Wacker Werke KG, Munich, Germany

[22] Filed: Apr. 29, 1974

[21] Appl. No.: 465,256

[30] Foreign Application Priority Data

Apr. 30, 1973 Germany............................ 2321761

[52] U.S. Cl. ................................................ 404/133
[51] Int. Cl. ............................................ E01c 19/30
[58] Field of Search ............ 404/133, 102, 113, 117

[56] References Cited
UNITED STATES PATENTS

| | | | |
|---|---|---|---|
| 1,955,101 | 4/1934 | Sloan | 404/113 |
| 3,283,677 | 11/1966 | Vebel | 404/133 |
| 3,732,022 | 5/1973 | Danuser | 404/133 |

Primary Examiner—Mervin Stein
Assistant Examiner—Steven Hawkins
Attorney, Agent, or Firm—Walter Becker

[57] ABSTRACT

A vibration plate system with an unbalance generator rigidly mounted on a vibration plate, and with an internal combustion engine which pertains to a surload and is resiliently cushioned relative to the vibration plate, the internal combustion engine serving as energy generator. The internal combustion engine drives an electric generator arranged on the surload, and the unbalance generator is driven by a pole changeable and reversible electric motor connected to the vibration plate. The last mentioned electric motor operates with the electric energy generated by the generator.

6 Claims, 3 Drawing Figures

PATENTED MAY 13 1975 3,883,260
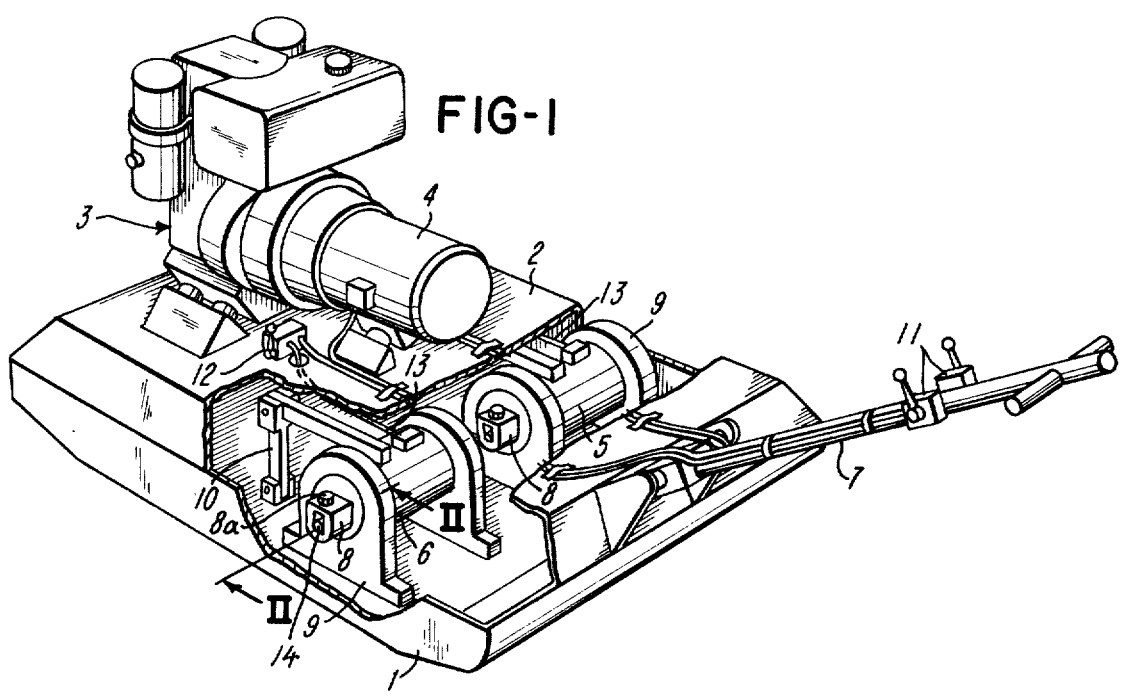
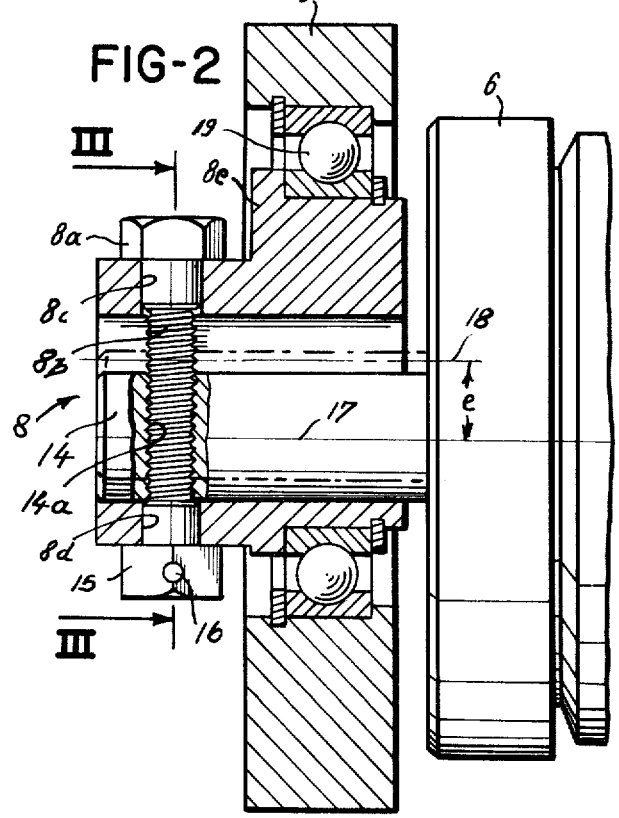
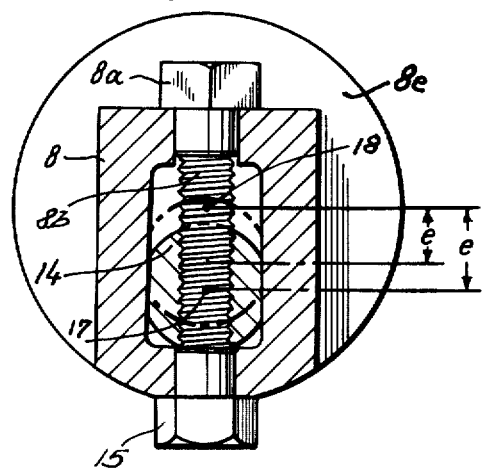

VIBRATION PLATE SYSTEM

The present invention relates to a vibration plate with an unbalance generator rigidly mounted on said vibration plate, and with an internal combustion engine which serves as energy generator and forms a part of the surcharge or additional load which is cushioned relative to said vibration plate.

With heretofore known vibration plates, the unbalance generator is driven by means of a V-belt or the like directly from the combustion engine. Such an arrangement requires that:

a. the frequency of operation of the unbalance generator can be varied only within narrow limits afforded by the internal combustion engine;

b. in view of the mechanical driving connection between the combustion engine and the unbalance generator, it is not possible tightly to encase the vibration plate proper with the unbalance generator, and c. a reversing of the direction of movement requires complicated mechanical devices.

In view of the fact that the frequency of operation can be varied only within relatively narrow limits, the heretofore known vibration plates can be employed only for a limited range or limited field of types of work. Thus, for instance, it is not possible to employ such plate both for the compacting of soil as well as for the compacting of a black top surface because the first mentioned operation requires a medium frequency of operation of approximately 1,800 per minute which is considerably lower than the last mentioned black top surfacing operation which requires a medium frequency of operation of approximately 3,600 per minute.

It is, therefore, an object of the present invention to provide a vibration plate system which will overcome the above mentioned drawbacks.

This object and other objects and advantages of the invention will appear more clearly from the following specification in connection with the accompanying drawings, in which:

FIG. 1 illustrates an isometric view of a vibration plate system according to the invention.

FIG. 2 is a section along the line II—II of FIG. 1.

FIG. 3 is a section along the line III—III of FIG. 2.

The vibration plate system according to the present invention, which comprises an unbalance generator rigidly mounted on the vibration plate and also comprises an internal combustion engine forming an energy generator and forms part of an additional load cushioned relative to the vibration plate, is characterized primarily in that the internal combustion engine drives an electric generator mounted on the additional load while the unbalance generator is driven by an electric motor which is pole changeable and reversible and which cooperates with the electric energy generated by the generator.

With the vibration plate system according to the present invention, the ground compacting plate proper, henceforth called the plate, can together with the unbalance generator and the electric motor directly connected thereto be completely encased because the energy transfer from the additional load to the devices arranged on said plate and serving for generating vibrations is effected exclusively through electric cables while no difficulties are encountered in passing such cables through a housing for encasing the unbalance generator and the electric motor. Furthermore, due to the pole changeability of the electric motor, a simple possibility has been created to vary the operational speed of the electric motor and the unbalance generator and thereby the working frequency of the plate in wide limits which will permit employing the vibration plate system for a wide field of work for instance for the above mentioned purposes of compacting the soil as well as for compacting black top surfacing. When the generator, as is customary, is designed for a medium frequency of 60 cycles per minute, a customary pole changeable electric motor and therewith the unbalance generator can be operated at a medium speed of either 1,800 or 3,600 RPM. As simple as the reversal of the operational frequency, also the device for forward and rearward drive is designed, because for this purpose it is merely necessary to reverse the electric motor. The switches necessary for this purpose are located on the guiding handle for the vibration plate system.

In addition to the above mentioned outstanding advantages of the present invention over vibration plate systems heretofore known, the invention has the additional advantage that the internal combustion engine and the generator may also be used as current generating unit at the building site, for which purpose it is merely necessary to provide a disconnecting switch in the cable connection between the generator and the electric motor on said plate as well as means for connecting external current conveying cables.

The costs for the generator and the electric motor which are to be spent over the heretofore known vibrators amount to only a fraction of the total costs of a vibrator plate or vibration plate and are far outweighed by the broadening of the possible field of employment of such a vibration plate system, the great facility in handling and operating the plate system without additional parts, especially forward and rearward drive, and the possibility of completely encasing the unbalance generator and electric motor while at the same time the mechanical driving connection which is particularly sensitive to soiling and which is provided between the internal combustion engine and the unbalance generator, is eliminated. Alone the broadening of the field of application brought about by the present invention amounts de facto to a considerable savings in costs while a single vibration plate system according to the invention permits the performance of jobs for which heretofore at least two vibration systems of the heretofore known design had to be used. The electric motor and the generator are preferably three phase current devices.

A further development of the present invention provides that the unbalance generator has an unbalance body which is adjustable as to distance from the axis of rotation. This feature makes it possible to adjust the unbalance force in conformity with the various selectable frequencies of operation and even makes it possible to operate with the same unbalance force at any of said frequencies of operation.

The present invention also makes it possible at only a relatively slight additional cost to outfit the vibration plate system for automatically effected movements through curves. This is realized in conformity with a further development of the invention by two unbalance generators each of which is driven by an electric motor of its own while said two unbalance generators are respectively arranged on both sides of a central plate extending in the direction of movement and with the shafts of said unbalance generators arranged in axial alignment.

The straight movement of the vibration plate system is obtained in this instance when both electric motors and therewith the pertaining unbalance generators are switched for movement in the same direction, whereas the switching off or the changing of the direction of rotation of one of the two electric motors with the other electric motor continuing its respective present direction of rotation brings about a movement through a curve toward the right or toward the left with regard to the straight movement.

Another further development of the invention consists in that for transferring the electric energy from the generator to the electric motor or motors, steel core cables are employed. While such cables have over customary cables with copper cores a higher electric resistance, they have over said copper core cables a considerably higher resistance against breakage which, in this instance, due to the high frequencies at which the plate and the additional load vibrate relative to each other, plays a very important role. The lowered electric resistance can be made up by increasing the number of cores or the core cross section.

Referring now to the drawing in detail, the device illustrated therein comprises the ground compacting plate proper 1 and a cover hood 2 which, together with the compacting plate 1 forms a closed housing or casing. The vibration plate system shown in the drawing furthermore comprises an internal combustion engine 3 having connected thereto an electric generator 4. The device according to the invention also comprises two pole changeable and reversible electric motors 5 and 6, respectively, which are mounted on the ground compacting plate 1. The vibration plate system is guided by a handle 7 which is connected to the hood 2.

The electric motors 5 and 6 are so arranged on plate 1 that their axes of rotation extend substantially perpendicularly with regard to the longitudinal axis of the vibration plate and are in axial alignment with each other.

Each of the electric motors 5 and 6 is, through the intervention of eccentric adjusting devices 8, which are located at both ends of the rotor shaft and are mounted in brackets 9, eccentrically arranged with regard to the rotor shaft while the motor housing is by means of a rocking lever 10 prevented from turning. The eccentricity $e$ between the rotor shaft and the longitudinal central axis is adjustable by means of an eccentric adjusting screw $8a$ which pertains to the eccentric adjusting device 8. When the respective motor 5 or 6 is energized, it moves on a circular path the radius of which corresponds to the eccentricity $e$ around the axis of the bearing and thus simultaneously acts as unbalance generator.

The electric motors are by means of reversing switches 11 connected to the handle 7 adapted by the operator to be caused to turn in one or the other direction.

A pole changing switch 12 is interposed in the current supply from the respective reversing switch 11 to the pertaining electric motor. This switch 12, which is connected to the hood 2, permits changing the medium speed of the electric motors while the medium frequency of the electric generator 4 remains the same.

The current supply cable 13 from the pole changing switch 12 to the respective electric motor has cores of spring steel wire.

By means of the eccentric adjusting screw $8a$, the eccentricity $e$ can be so adjusted that for the selected medium speed of the electric motor which simultaneously serves as an unbalance generator, the unbalance force required for the respective compacting work will be obtained.

The eccentric screw adjustment is best shown in FIGS. 2 and 3. As will be seen from these Figures, the adjusting screw $8a$ is provided with a thread $8b$ which meshes with a corresponding thread $14a$ of the motor shaft 14 pertaining to the electric motor 6. The adjusting screw $8a$ which extends through aligned bores $8c$ and $8d$ in the eccentric ring $8e$ is secured in the eccentric ring $8e$ by means of a nut 15 and a cotter pin 16.

It will be appreciated that if it is desired to change the eccentricity of the axis 17 of motor shaft 14 relative to the axis 18 of the eccentric ring $8e$, it is merely necessary to turn the adjusting screw $8a$ in one direction or the other direction, depending on whether the eccentricity $e$ is to be increased or decreased. The eccentric ring $8e$ is journalled in antifriction bearing 19 in the brake 9. While the above detailed description of the adjusting device refers only to the adjustment of the eccentricity of the electric motor 6 with regard to the eccentric ring $8e$, it is to be understood that a corresponding adjusting arrangement applies to the electric motor 5.

The internal combustion engine 3 and the current generator 4 are in a cushioned manner mounted on the hood 2 and together form the additional load or surload for the vibration plate. The cushioned manner in which the combustion engine 3 and the generator 4 are mounted on the hood 2 may be of any desired type for instance by springs.

It is, of course, to be understood that the present invention is, by no means, limited to the specific showing in the drawing but also comprises any modifications within the scope of the appended claims.

What I claim is:

1. A vibration plate system which includes: a vibration plate, a surload, cushioning means interposed between said vibration plate and said surload and resting the latter on said vibration plate, said surload comprising an internal combustion engine and an electric generator means drivingly connected to said engine to be driven thereby, electric motor means adapted to be supplied with electric energy from said generator means and including rotor means with rotor shaft means, and means eccentrically supporting said rotor shaft means and together said electric motor means forming unbalance generator means operatively connected to said vibration plate for imparting an unbalance thereon.

2. A vibration plate system according to claim 1, in which said electric motor is a pole changeable and reversible electric motor.

3. A vibration plate system according to claim 1, in which said electric generator means are three-phase current devices.

4. A vibration plate system according to claim 1, in which said unbalance generating means includes an unbalance body adjustable for varying its distance from the axis of rotation of said electric motor means.

5. A vibration plate system according to claim 1, in which said unbalance generator means include two unbalance generators having their shafts in alignment with each other and extending on opposite sides of the central plane therebetween, and in which said electric motor means include two electric motors.

6. A vibration plate system according to claim 1, in which said electric generator means and said electric motor means are connected to each other by steel core cables.

* * * * *